(12) United States Patent     (10) Patent No.:   US 12,574,402 B2
Ueda et al.     (45) Date of Patent:    Mar. 10, 2026

(54) DATA PROCESSING DEVICE, DATA PROCESSING METHOD, AND RECORDING MEDIUM

(71) Applicant: NEC Corporation, Tokyo (JP)

(72) Inventors: Hirofumi Ueda, Tokyo (JP); Kohei Tatara, Tokyo (JP)

(73) Assignee: NEC CORPORATION, Tokyo (JP)

( * ) Notice: Subject to any disclaimer, the term of this patent is extended or adjusted under 35 U.S.C. 154(b) by 59 days.

(21) Appl. No.: 18/692,860

(22) PCT Filed: Oct. 22, 2021

(86) PCT No.: PCT/JP2021/039119
§ 371 (c)(1),
(2) Date: Mar. 18, 2024

(87) PCT Pub. No.: WO2023/067801
PCT Pub. Date: Apr. 27, 2023

(65) Prior Publication Data
US 2025/0141910 A1    May 1, 2025

(51) Int. Cl.
*H04L 9/40*       (2022.01)
(52) U.S. Cl.
CPC ................................. *H04L 63/1433* (2013.01)
(58) Field of Classification Search
CPC ............................. H04L 63/1433; G06F 21/57
See application file for complete search history.

(56) References Cited

U.S. PATENT DOCUMENTS 5,835,726 A * 11/1998 Shwed .................. H04L 63/123
                                         726/13
2014/0123294 A1* 5/2014 Koide ..................... H04L 63/10
                                         726/25
(Continued)

FOREIGN PATENT DOCUMENTS

JP        6307453 B2     4/2018
WO     2014/185165 A1   11/2014
WO     2020/115853 A1    6/2020

OTHER PUBLICATIONS

International Search Report for PCT Application No. PCT/JP2021/039119, mailed on Jan. 18, 2022.
(Continued)

*Primary Examiner* — El Hadji M Sall
(74) *Attorney, Agent, or Firm* — Sughrue Mion, PLLC

(57) ABSTRACT
To provide a virtual model for a communication system, the virtual model being required for specific diagnosis of the security risk of the communication system. An acquisition unit (11) acquires the inspection result of an information security inspection on a device constituting a communication system, an extraction unit (12) extracts, from the inspection result, security inspection information including at least one of first information about a library function used by the constituent device or second information about the presence or absence of access to a file via the library function, and a generation unit (13) generates a virtual model for the communication system by using configuration information for identifying a constituent component of an information communication device and the security inspection information.

8 Claims, 9 Drawing Sheets

(56) References Cited

U.S. PATENT DOCUMENTS

2017/0374087 A1* 12/2017 Akashi ............... H04L 63/1416
2021/0377293 A1* 12/2021 Takeuchi ............... H04L 12/28

OTHER PUBLICATIONS

English translation of Written opinion for PCT Application No. PCT/JP2021/039119, mailed on Jan. 18, 2022.
Akihiko Sugimoto et al., Risk evaluation system based on dynamic modeling, CSS 2014 Computer Security Symposium 2014 Proceedings, Oct. 15, 2014, vol. 2014, No. 2, p. 100 to 107.

* cited by examiner

Fig.4

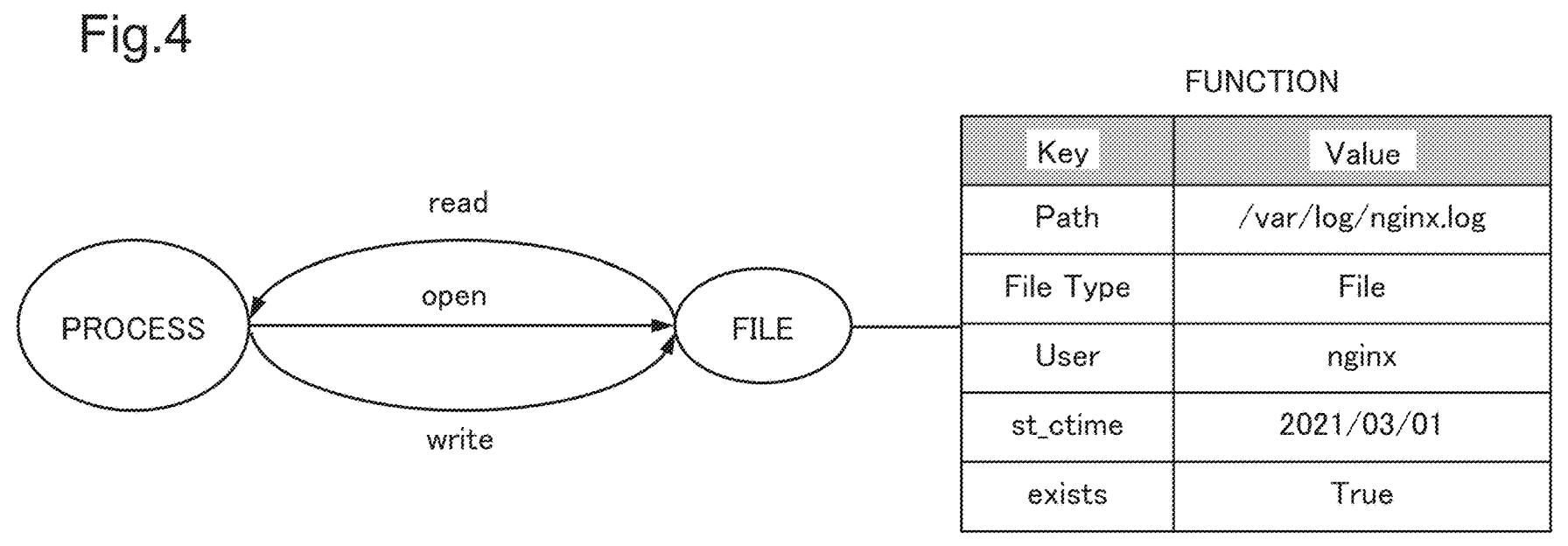

FUNCTION

| Key | Value |
|-----|-------|
| Path | /var/log/nginx.log |
| File Type | File |
| User | nginx |
| st_ctime | 2021/03/01 |
| exists | True |

FILE read
open
write

PROCESS

Fig.5

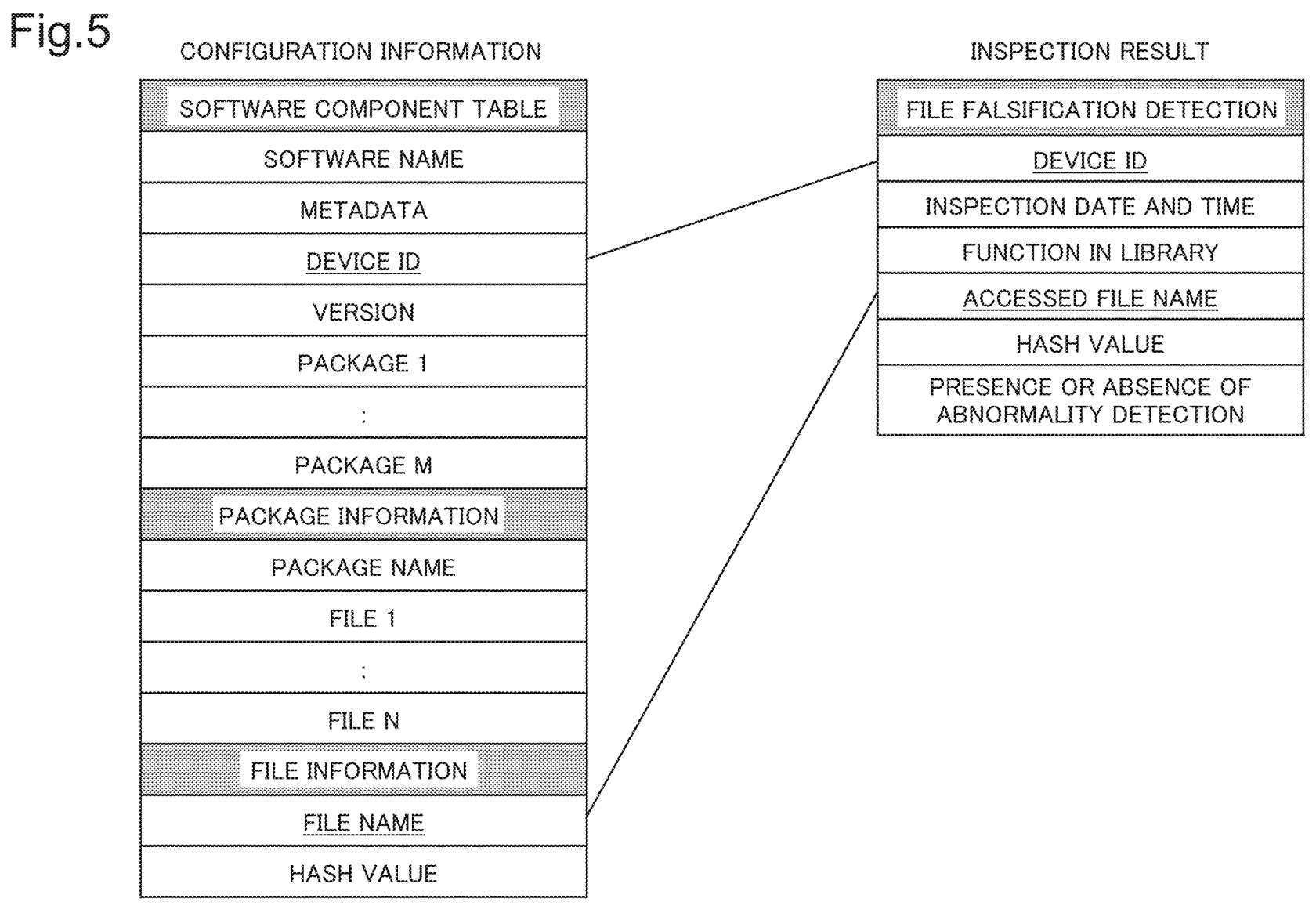

INSPECTION RESULT

| FILE FALSIFICATION DETECTION |
|---|
| DEVICE ID |
| INSPECTION DATE AND TIME |
| FUNCTION IN LIBRARY |
| ACCESSED FILE NAME |
| HASH VALUE |
| PRESENCE OR ABSENCE OF ABNORMALITY DETECTION |

CONFIGURATION INFORMATION

| SOFTWARE COMPONENT TABLE |
|---|
| SOFTWARE NAME |
| METADATA |
| DEVICE ID |
| VERSION |
| PACKAGE 1 |
| : |
| PACKAGE M |

| PACKAGE INFORMATION |
|---|
| PACKAGE NAME |
| FILE 1 |
| : |
| FILE N |

| FILE INFORMATION |
|---|
| FILE NAME |
| HASH VALUE |

DATA PROCESSING DEVICE, DATA PROCESSING METHOD, AND RECORDING MEDIUM

This application is a National Stage Entry of PCT/JP2021/039119 filed on Oct. 22, 2021, the contents of all of which are incorporated herein by reference, in their entirety.

TECHNICAL FIELD

The present invention relates to a data processing device, a data processing method, and a recording medium, and more particularly, to a data processing device, a data processing method, and a recording medium that generate a virtual model of a communication system and diagnose a security risk using the virtual model.

BACKGROUND ART

Communication systems may be subject to various cyberattacks, such as stealing confidential information, erasing protected data, website falsification, virus infection, privileged ID theft, or unauthorized access and unauthorized manipulation of web servers.

A cyberattack on a communication system is executed by using a defect caused by a fault or a design mistake of software (including software components, firmware, and middleware) of a device configuring the communication system. Such a defect is called software vulnerability or security hole.

In a related art, a virtual model of a communication system is generated by using a vulnerability diagnosis tool, an asset management tool, and the like. An attack route assumed for the communication system is analyzed by executing an attack simulation using the virtual model. In the related art, an attack simulation can be performed on a virtual environment in such a way that business activities are not affected, and costs of constructing a physical duplication environment can be saved.

CITATION LIST

Patent Literature

PTL 1: Japanese Patent No. 6307453

SUMMARY OF INVENTION

Technical Problem

In the virtual model generated according to the related art, details of the vulnerability of the software are unknown. Thus, in the related art, it is difficult to diagnose in detail whether an attack is established on the communication system in a case where which information communication device configuring the communication system is under what kind of attack according to what kind of attack scenario.

The present invention has been made in view of the above problems, and an object thereof is to provide a virtual model of a communication system necessary for diagnosing a security risk of the communication system in detail.

Solution to Problem

According to one aspect of the present invention, there is provided a data processing device including acquisition means for acquiring an inspection result of an information security inspection for a constituent device configuring a communication system, extraction means for extracting, from the inspection result, security inspection information including at least one of first information indicating a library function used by the constituent device or second information indicating presence or absence of access to a file through the library function, and generation means for generating a virtual model of the communication system by using configuration information indicating a constituent component of the constituent device and the security inspection information.

According to another aspect of the present invention, there is provided a data processing method including acquiring an inspection result of an information security inspection for a constituent device configuring a communication system, extracting, from the inspection result, security inspection information including at least one of first information indicating a library function used by the constituent device or second information indicating presence or absence of access to a file through the library function, and generating a virtual model of the communication system by using configuration information indicating a constituent component of the constituent device and the security inspection information.

According to still another aspect of the present invention, there is provided a recording medium storing a program for causing a computer to execute acquiring an inspection result of an information security inspection for a constituent device configuring a communication system, extracting, from the inspection result, security inspection information including at least one of first information indicating a library function used by the constituent device or second information indicating presence or absence of access to a file through the library function, and generating a virtual model of the communication system by using configuration information indicating a constituent component of the constituent device and the security inspection information.

Advantageous Effects of Invention

According to an aspect of the present invention, it is possible to provide a virtual model of a communications system necessary for diagnosing a security risk of the communications system in detail.

BRIEF DESCRIPTION OF DRAWINGS

FIG. 4 is a call graph schematically illustrating access to a file through a function in a library from a constituent device configuring the communication system.

FIG. 5 is a diagram illustrating a set of an example of configuration information indicating a constituent component of a constituent device and an example of an inspection result related to the constituent device.

EXAMPLE EMBODIMENT

Some example embodiments of the present invention will be described below with reference to the drawings.

Communication System 1

Figure 1:
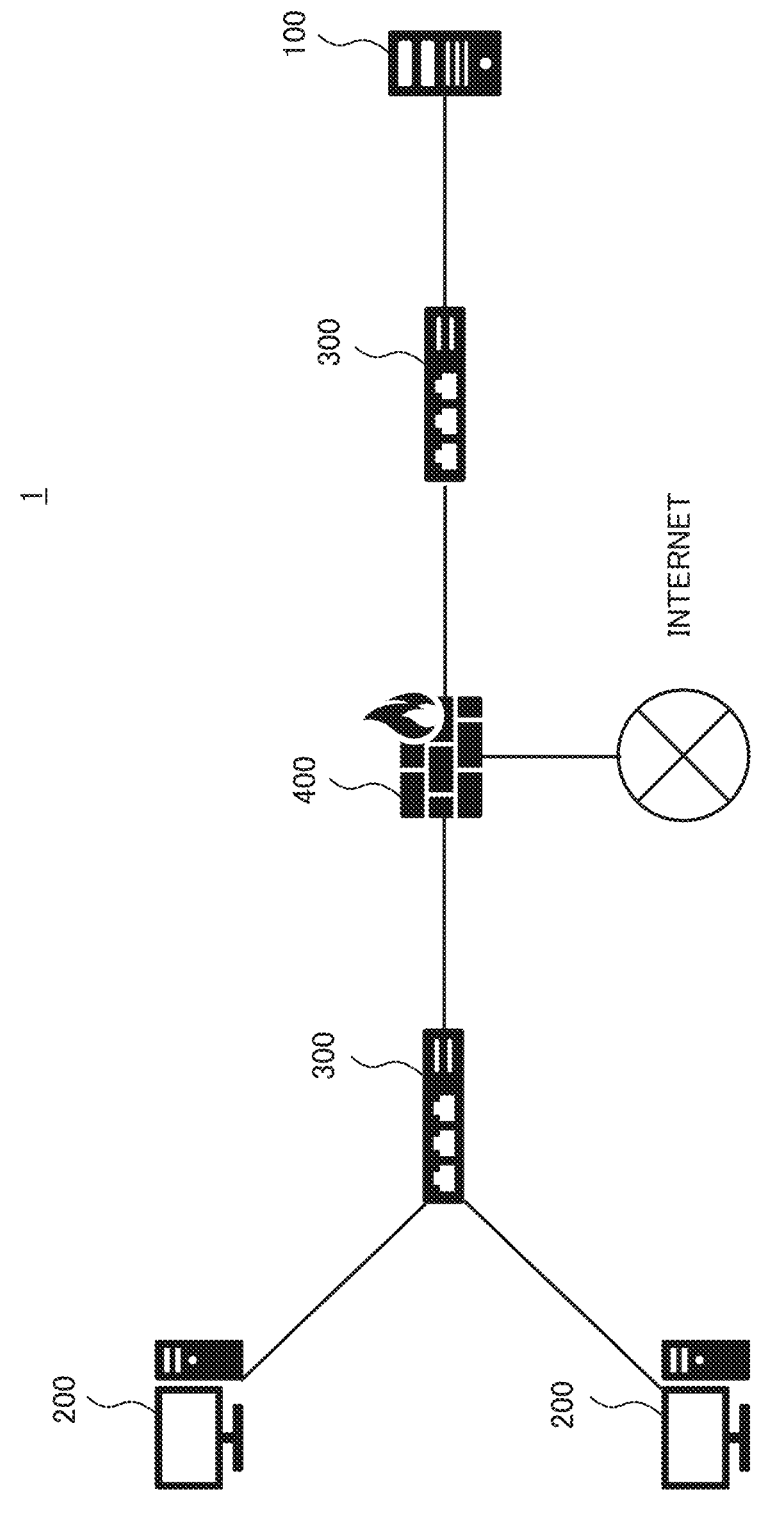
FIG. 1 is a diagram schematically illustrating an example of a communication system that is an entity of a virtual model generated by a data processing device according to first to third example embodiments.

An example of a configuration of a communication system I will be described with reference to FIG. 1. FIG. 1 is a diagram schematically illustrating an example of a configuration of the communication system 1. For example, the communication system 1 is any one of an Internet of Things (IoT) system, an information and communication technology (ICT) system, a local area network (LAN), an infrastructure system, and an industrial control system (ICS).

The communication system 1 is an entity of a virtual model generated by data processing devices 10, 20, and 30 according to first to third example embodiments that will be described later. That is, the data processing devices 10, 20, and 30 execute data processing for generating a virtual model of the communication system 1.

As illustrated in FIG. 1, the communication system 1 includes a switch 300 and a firewall 400 in addition to the control server 100 and the client terminal 200 (hereinafter, referred to as nodes 100 and 200). The communication system I constructs a communication network such as a local area network (LAN) or a wide area network (WAN). In FIG. 1, a line connecting constituent devices (the nodes 100 and 200, the switch 300, and the firewall 400) of the communication system 1 indicates that the constituent devices can communicate with each other.

The nodes 100 and 200 are hardware devices or software having a communication function and an information processing function (calculation function). For example, the nodes 100 and 200 are personal computers, human machine interfaces (HMIs), control servers, log servers, programmable logic controllers (PLCs), application programming interfaces (APIs), Internet of Things (IoT) devices, or mobile devices. Here, it is assumed that a node 100 is a client terminal (for example, a personal computer), and a node 200 is a control server.

The switch 300 is a network device that achieves a routing function through hardware processing, and is, for example, Ethernet. As illustrated in FIG. 1, the switch 300 has a function of transferring communication between constituent devices of the communication system 1.

The firewall 400 is provided between the constituent devices of the communication system 1 and between the communication system 1 and an external network (the Internet in FIG. 1), and restricts data communication or communication connection for reasons such as computer security. The firewall 400 may be implemented in a router, or may be achieved as application software (a so-called application firewall).

The configuration of the communication system 1 illustrated in FIG. 1 is merely an example. For example, the communication system 1 may further include industrial equipment that is a target controlled by a PLC. Each of the node 100 and the node 200 may be one, or may be any plurality of two or more.

In the following description, "node 100 (200)" indicates at least one of the node 100 or the node 200.

First Example Embodiment

The first example embodiment will be described with reference to FIGS. 2 and 3.

Data Processing Device 10

A configuration of the data processing device 10 according to the first example embodiment will be described with reference to FIG. 2. FIG. 2 is a block diagram illustrating a configuration of the data processing device 10.

Figure 2:
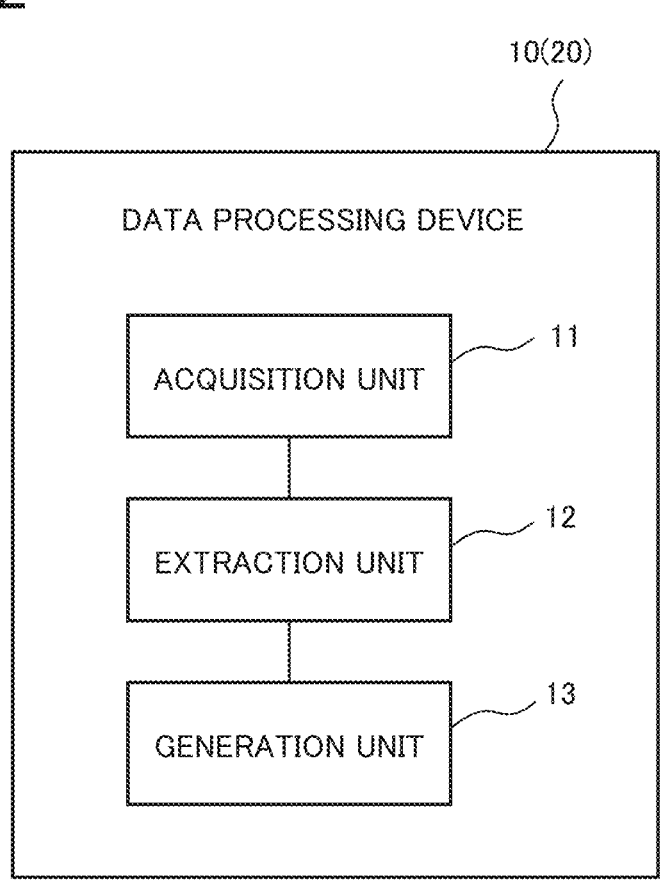
FIG. 2 is a block diagram illustrating a configuration of a data processing device according to the first example embodiment.

As illustrated in FIG. 2, the data processing device 10 includes an acquisition unit 11, an extraction unit 12, and a generation unit 13.

The acquisition unit 11 acquires an inspection result of an information security inspection regarding constituent devices (in FIG. 1, the nodes 100 and 200, the switch 300, and the firewall 400) configuring the communication system 1 (FIG. 1). The acquisition unit 11 is an example of acquisition means.

For example, the acquisition unit 11 acquires a software analysis result for a constituent device configuring the communication system 1 from a first database (not illustrated) storing software analysis information. Examples of the software analysis include source code analysis, binary code analysis, open source software (OSS) analysis, coding check, port scan, and software installation scan.

For example, the inspection result of the information security inspection for the constituent device includes information indicating which function in a library used by the constituent devices has accessed which file.

Alternatively, the acquisition unit 11 may acquire the inspection result of the information security inspection for the constituent device configuring the communication system 1 from a software analysis device (not illustrated). The acquisition unit 11 may include, as a part thereof, a software analysis unit that executes software analysis for the constituent device.

The acquisition unit 11 outputs the inspection result of the information security inspection for the constituent device configuring the communication system I to the extraction unit 12.

The extraction unit 12 extracts, from the inspection result, security inspection information including at least one of first information indicating a library function used by the constituent device or second information indicating the presence or absence of access to the file through the library function. The extraction unit 12 is an example of extraction means.

For example, the extraction unit 12 receives, from the acquisition unit 11, the inspection result of the information security inspection for the constituent device configuring the communication system 1.

The extraction unit 12 acquires a software component table for the constituent device from a second database (not illustrated) that stores configuration information indicating constituent components of the constituent device. The extraction unit 12 specifies a library function used by the constituent device from the software component table. The "library function" is a group of functions collected in a so-called function library.

Next, the extraction unit 12 extracts, from the inspection result received from the acquisition unit 11, security inspection information including at least one of first information indicating a library function used by the constituent device or second information indicating the presence or absence of access to the file through the library function. Access to a file includes opening a file and reading/writing a file.

The extraction unit 12 outputs the security inspection information regarding the constituent device to the generation unit 13.

The generation unit 13 generates a virtual model of the communication system 1 by using the configuration information specifying the constituent component of the constituent device and the security inspection information. The generation unit 13 is an example of generation means.

For example, the generation unit 13 receives the security inspection information regarding the constituent device from the extraction unit 12. The generation unit 13 acquires, from a second database (not illustrated), configuration information specifying a constituent component of a constituent device.

The generation unit 13 generates the virtual model of the communication system 1 by using the configuration information specifying the constituent component of the constituent device and the security inspection information. The virtual model is a copy of the communication system 1 in a digital space, in other words, a representation of the communication system 1 on a computer. An example of use of the virtual model is to diagnose a security risk of the communication system 1 in detail and with high accuracy by using a computer.

The generation unit 13 may store the generated virtual model of the communication system 1 in a third database (not illustrated).

Operation of Data Processing Device 10

An operation of the data processing device 10 according to the first example embodiment will be described with reference to FIG. 3. FIG. 3 is a flowchart illustrating a flow of processing executed by each unit of the data processing device 10.

Figure 3:
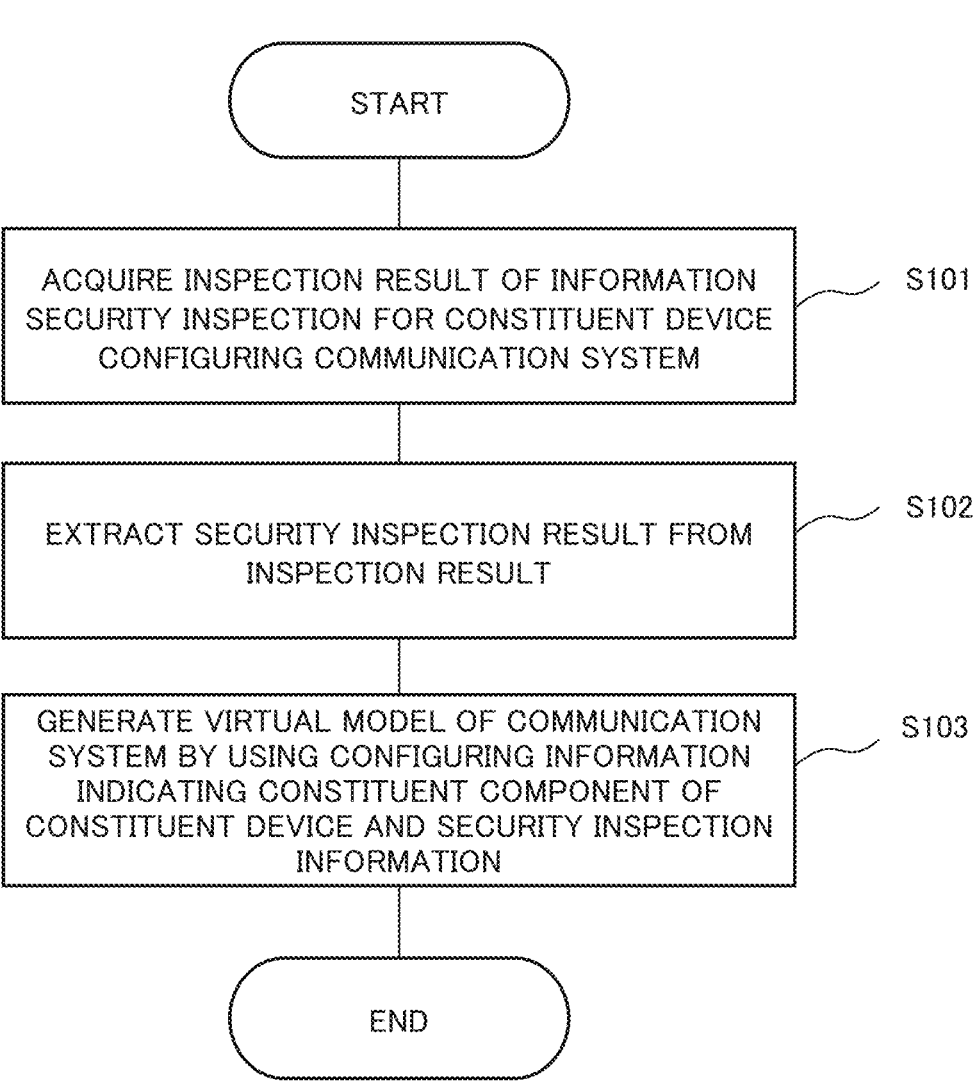
FIG. 3 is a flowchart illustrating an operation of the data processing device according to the first example embodiment.

As illustrated in FIG. 3, first, the acquisition unit 11 acquires an inspection result of an information security inspection for a constituent device configuring the communication system 1 (S101). The acquisition unit 11 outputs the inspection result of the information security inspection to the extraction unit 12.

The extraction unit 12 receives the inspection result of the information security inspection from the acquisition unit 11.

Next, the extraction unit 12 extracts security inspection information including at least one of first information indicating a library function used by the constituent device or second information indicating the presence or absence of access to a file through the library function from the received inspection result (S102). The extraction unit 12 outputs the security inspection information regarding the constituent device to the generation unit 13.

The generation unit 13 receives the security inspection information regarding the constituent device from the extraction unit 12. The generation unit 13 acquires configuration information specifying a constituent component of a constituent device from the second database (not illustrated) that stores the configuration information.

Subsequently, the generation unit 13 generates a virtual model of the communication system 1 by using the configuration information identifying the constituent component of the constituent device and the security inspection information (S103). Thereafter, the generation unit 13 may store the generated virtual model of the communication system 1 in the third database (not illustrated).

With this, the operation of the data processing device 10 according to the first example embodiment is ended.

Effects of Present Example Embodiment

According to the configuration of the present example embodiment, the acquisition unit 11 acquires an inspection result of an information security inspection for the constituent device configuring the communication system 1. The extraction unit 12 extracts, from the inspection result, security inspection information including at least one of first information indicating a library function used by the constituent device or second information indicating the presence or absence of access to the file through the library function. The generation unit 13 generates a virtual model of the communication system 1 by using the configuration information specifying the constituent component of the constituent device and the security inspection information.

The virtual model of the communication system 1 is generated by using not only the configuration information of the constituent device but also the security inspection information including at least one of the first information indicating the library function used by the constituent device or the second information indicating the presence or absence of access to the file through the library function. As a result, it is possible to provide a virtual model of the communication system I necessary for diagnosing a security risk of the communication system 1 in detail.

Second Example Embodiment

The second example embodiment will be described with reference to FIGS. 4 to 6. In the second example embodiment, an example of a method of generating a virtual model of the communication system 1 configuring the above-described communication system 1 (FIG. 1) will be described. A configuration and an operation of the data processing device 20 according to the second example embodiment are the same as the configuration and the operation of the data processing device 10 (FIG. 2) according to the first example embodiment. In the second example embodiment, the description of the configuration and the operation of the data processing device 20 will be omitted by referring to the description in the first example embodiment.

Example of Inspection Result

With reference to FIG. 4, an inspection result of an information security inspection for a constituent device configuring the communication system I will be described. FIG. 4 is a diagram illustrating an example of software analysis information related to a constituent device configuring the communication system 1, and is a diagram illustrating an example of a call graph visualizing a function called during execution of a certain process or a call relationship between functions.

As illustrated in FIG. 4, according to software analysis information regarding a constituent device configuring the communication system 1, a relationship between a file being read/written in a certain process and a function in a library being used can be known.

As described in the first example embodiment, the acquisition unit 11 acquires the inspection result of the information security inspection for the constituent device configuring the communication system 1. The inspection result includes information indicating a relationship between a library used by the constituent device configuring the communication system 1 and a file accessed through a specific function in the library in the software analysis information described above.

Configuration Information and Inspection Result

With reference to FIG. 5, a correspondence relationship between configuration information indicating a constituent component of a constituent device configuring the communication system 1 and an inspection result (FIG. 4) of an information security inspection for the constituent device will be described. FIG. 5 illustrates an example of configuration information and an inspection result related to a constituent device configuring the communication system 1.

As illustrated in FIG. 5, the configuration information includes a software component table, package information, and file information. The configuration information may further include a hardware component table indicating a hardware configuration. However, the concept of software described here also includes firmware.

In one example, the software component table of the configuration information includes each piece of information about a software name, metadata, a device ID for specifying a constituent device, a version, and a package (1 to M). The package herein refers to a program component, and includes concepts of a component, a library, and a module.

The package information includes a package name of each of the packages (1 to M) and information regarding each of files (1 to N) configuring the package. The file information includes a file name assigned to each of the files (1 to N) and information regarding a hash value for determining the identity of the file.

In one example, the inspection result includes a result of file falsification detection. The inspection result related to file falsification detection includes each piece of information regarding a device ID for specifying a constituent device, an inspection date and time, a function in a library used by the constituent device, an accessed file name, a hash value for determining the identity of the file, and the presence or absence of abnormality detection.

As can be seen from FIG. 5, the device ID included in the configuration information corresponds to the device ID included in the inspection result. The constituent device configuring the communication system 1 is identified by the device ID. The file name and its hash value included in the configuration information correspond to the accessed file name and its hash value included in the inspection result.

As described in the first example embodiment, the extraction unit 12 extracts the security inspection information from the inspection result of the information security inspection for the constituent device configuring the communication system 1. The security inspection information includes information indicating a function in a library used by the node 100 (200) and information indicating a file accessed for reading and writing.

In this case, the extraction unit 12 extracts the inspection result of the information security inspection for the constituent device configuring communication system 1 from the second database (not illustrated) based on a correspondence relationship between the device ID included in the configuration information and the device ID included in the inspection result.

Configuration Example of Virtual Model: Configuration Information and Security Inspection Information FIG. 6 is a diagram illustrating a configuration example of a virtual model of the communication system 1. As illustrated in FIG. 6, the virtual model includes configuration information indicating a constituent component of the node 100 (200) and security inspection information extracted from the inspection result (FIG. 4) of the information security inspection for the constituent device configuring the communication system 1.

Figure 6:
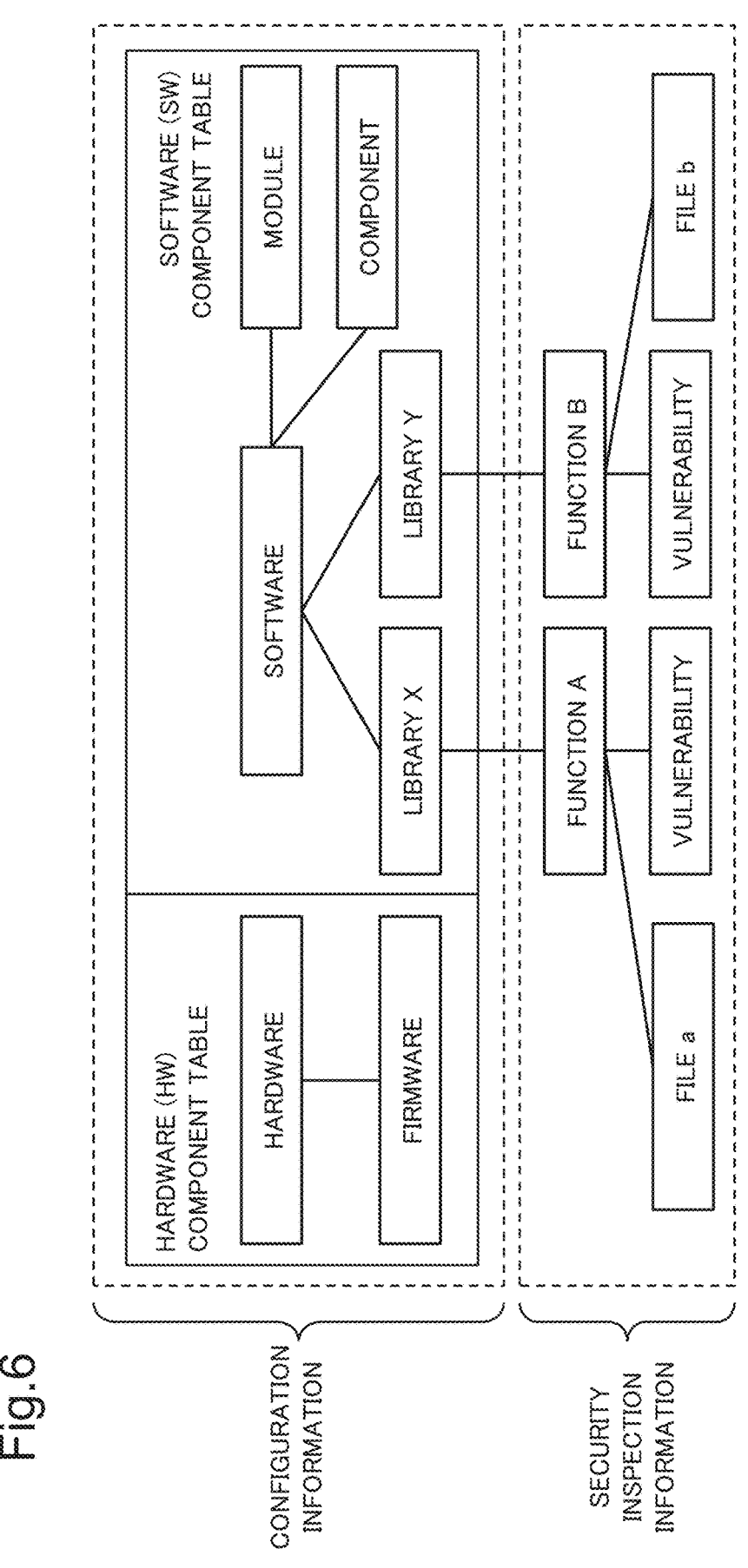
FIG. 6 is a diagram schematically illustrating an example of a virtual model of the communication system.

In the virtual model illustrated in FIG. 6, information indicating libraries X and Y used by certain software is associated with information indicating files a and b accessed through functions A and B in the libraries X and Y.

As described in the first example embodiment, the generation unit 13 generates the virtual model of the communication system 1 by using the configuration information indicating the constituent component of the node 100 (200) and the security inspection information. In this case, the generation unit 13 specifies which function in the library used by the constituent device has accessed which file based on the security inspection information. The generation unit 13 associates information indicating the libraries X and Y used by certain software with information indicating the files a and b accessed through the functions A and B in the libraries X and Y (FIG. 6).

Effects of Present Example Embodiment

According to the configuration of the present example embodiment, the acquisition unit 11 acquires an inspection result of an information security inspection for the constituent device configuring the communication system 1. The extraction unit 12 extracts, from the inspection result, security inspection information including at least one of first information indicating a library function used by the constituent device or second information indicating the presence or absence of access to the file through the library function. The generation unit 13 generates a virtual model of the communication system 1 by using the configuration information specifying the constituent component of the constituent device and the security inspection information.

The virtual model of the communication system I is generated by using not only the configuration information indicating the constituent component of the constituent device but also the security inspection information including at least one of the first information indicating the library function used by the constituent device or the second information indicating the presence or absence of access to the file through the library function. As a result, it is possible to provide a virtual model of the communication system I necessary for diagnosing a security risk of the communication system 1 in detail.

Third Example Embodiment

The third example embodiment will be described with reference to FIGS. 7 and 8. In the third example embodiment, as an example of use of the virtual model of the communication system 1 described in the first and second example embodiments, a configuration in which the virtual model is used in an attack simulation on the communication system I will be described.

Data Processing Device 30

Figure 7:
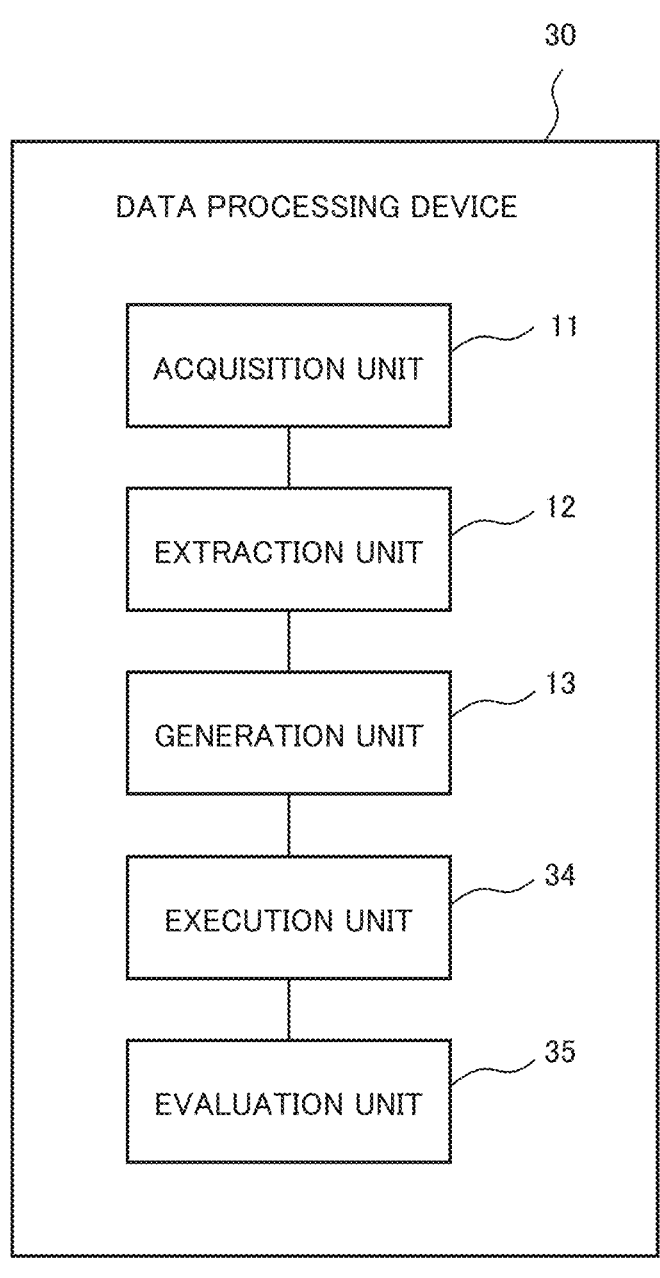
FIG. 7 is a block diagram illustrating a configuration of a data processing device according to the third example embodiment.

With reference to FIG. 7, a configuration of a data processing device 30 according to the third example embodiment will be described. FIG. 7 is a block diagram illustrating a configuration of the data processing device 30.

As illustrated in FIG. 7, the data processing device 30 includes an acquisition unit 11, an extraction unit 12, and a generation unit 13. The data processing device 30 further includes an execution unit 34 and an evaluation unit 35. Among the constituent elements of the data processing device 30, for the same constituent elements as those of the data processing devices 10 and 20 according to the first and second example embodiments, in the third example embodiment, the redundant description will be omitted by referring to the description in the first and second example embodiments.

The execution unit 34 executes an attack simulation on the communication system 1 by using the virtual model. The execution unit 34 is an example of execution means.

In one example, the execution unit 34 receives data of the virtual model of the communication system 1 from the generation unit 13. As described in the first example embodiment, the virtual model is a digital copy of the communication system 1. The execution unit 34 executes an attack simulation on the communication system 1 by using the received virtual model.

For example, the execution unit 34 performs an attack simulation based on an attack scenario using various cyberattack methods on a virtual environment. For example, the cyberattack methods include an attack using a mail or a Web, data falsification, spoofing, and an attack on an isolated network using a device (example: a memory, a smartphone, or a digital camera) connected to a Universal Serial Bus (USB).

In one example, first, preconditions such as a start point and an end point of an attack on the communication system 1, attack means, and a cause of the attack (a defect, a mistake, or the like) are input to the data processing device 30. Thereafter, the execution unit 34 executes the attack simulation on the communication system 1 according to the preconditions by using an attack graph generation technology, an existing penetration test tool, or an analysis tool having the equivalent function.

The execution unit 34 outputs a result of the attack simulation on the communication system 1 to the evaluation unit 35. For example, the result of the attack simulation includes information regarding the number of alternative attack routes, the number of attack steps, the presence or absence of ExploitCode, the presence or absence of user participation, and the success or failure of the attack.

The evaluation unit 35 evaluates a security risk of the communication system 1 based on the result of the attack simulation. The evaluation unit 35 is an example of evaluation means.

In one example, the evaluation unit 35 receives the result of the attack simulation on the communication system 1 from the execution unit 34. The evaluation unit 35 calculates an index representing the security risk of the communication system 1 based on the received result of the attack simulation. For example, the evaluation unit 35 calculates a threat level, a vulnerability level, and a business damage level based on the result of the attack simulation. For example, the evaluation unit 35 calculates the index exemplified above by converting information included in the result of the attack simulation into several parameters and substituting these parameters into a predetermined evaluation formula.

The evaluation unit 35 calculates a security risk value (hereinafter, abbreviated to a risk value) based on at least one of the respective calculation results of the threat level, the vulnerability level, or the business damage level. The risk value represents a magnitude of the security risk or the degree of urgency.

The evaluation unit 35 may output data of the calculated risk value or alert information based on the risk value to an external device. Alternatively, the evaluation unit 35 may store the data of the risk value in a storage device (not illustrated).

Consequently, a system administrator or a user can accurately recognize the security risk of the communication system 1 with reference to the risk value calculated by the evaluation unit 35, and can consider and implement an appropriate measure according to the evaluation result of the security risk.

Operation of Data Processing Device 30

An operation of the data processing device 30 according to the third example embodiment will be described with reference to FIG. 8. FIG. 8 is a flowchart illustrating a flow of processing executed by each unit of the data processing device 30.

Figure 8:
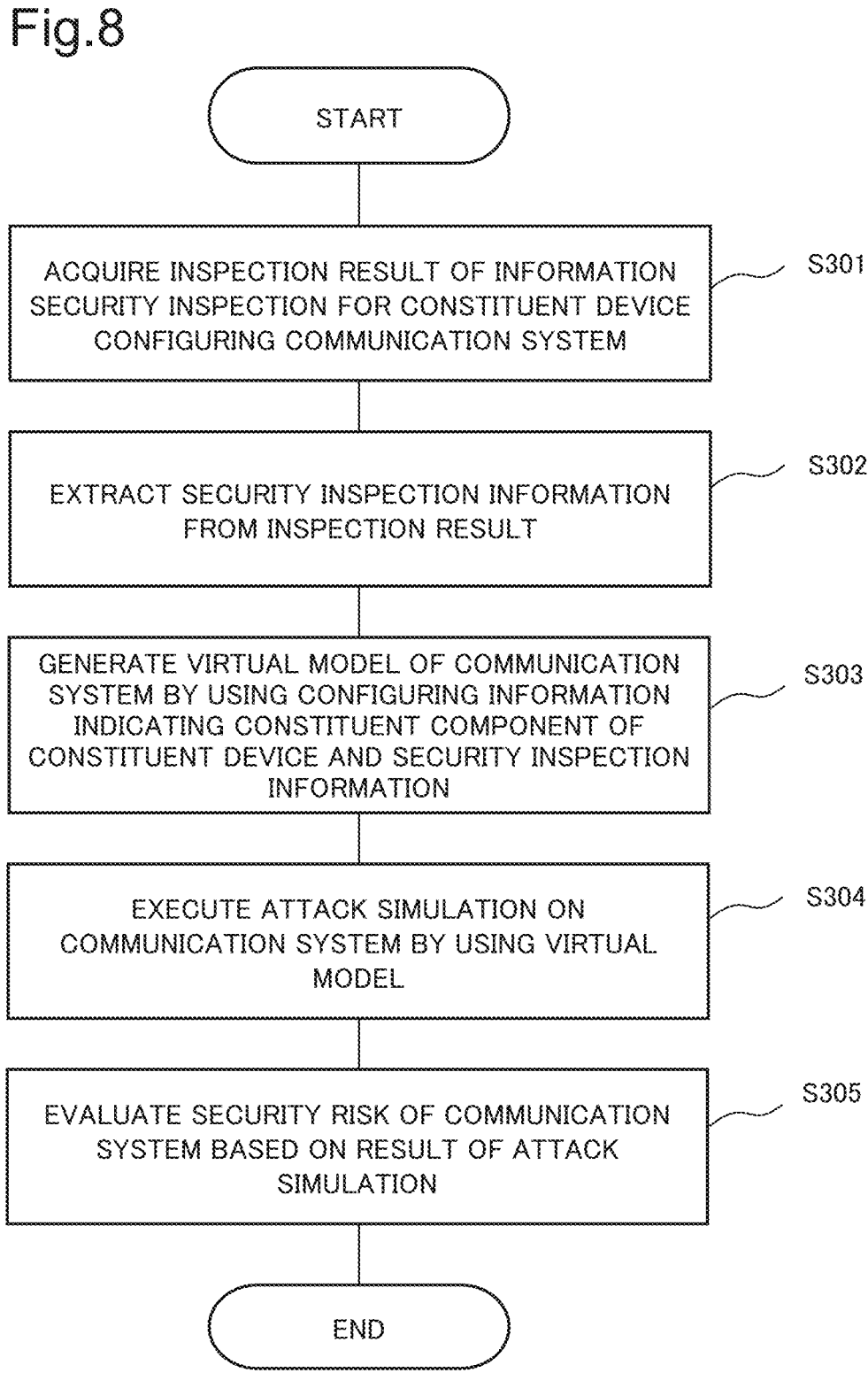
FIG. 8 is a flowchart illustrating an operation of the data processing device according to the third example embodiment.

As illustrated in FIG. 8, first, the acquisition unit 11 acquires an inspection result of an information security inspection for a constituent device configuring the communication system 1 (S301). The acquisition unit 11 outputs the inspection result of the information security inspection to the extraction unit 12.

The extraction unit 12 receives the inspection result of the information security inspection for the constituent device configuring the communication system 1 from the acquisition unit 11.

Next, the extraction unit 12 extracts security inspection information including at least one of first information indicating a library function used by the constituent device or second information indicating the presence or absence of access to a file through the library function from the received inspection result (S302). The extraction unit 12 outputs the security inspection information regarding the constituent device to the generation unit 13.

The generation unit 13 receives the security inspection information regarding the constituent device from the extraction unit 12. The generation unit 13 acquires configuration information specifying a constituent component of a constituent device from the second database (not illustrated) that stores the configuration information.

Subsequently, the generation unit 13 generates a virtual model of the communication system 1 by using configuration information identifying a constituent component of the constituent device and the security inspection information (S303). Thereafter, the generation unit 13 may store the generated virtual model of the communication system 1 in the third database (not illustrated).

The generation unit 13 outputs the virtual model of the communication system 1 to the execution unit 34.

The execution unit 34 receives the virtual model of the communication system 1 from the generation unit 13. The execution unit 34 executes an attack simulation on the communication system 1 by using the virtual model (S304).

The execution unit 34 outputs a result of the attack simulation on the communication system 1 to the evaluation unit 35.

The evaluation unit 35 receives the result of the attack simulation on the communication system 1 from the execution unit 34. The evaluation unit 35 evaluates the security risk of the communication system 1 based on the result of the attack simulation (S305). For example, the evaluation unit 35 calculates a risk value indicating a magnitude of the security risk or the degree of urgency.

Thereafter, the evaluation unit 35 may output data of the calculated risk value or alert information based on the risk value to an external device. Alternatively, the evaluation unit 35 may store the data of the risk value in a storage device (not illustrated).

As described above, the operation of the data processing device 30 according to the third example embodiment is ended.

Effects of Present Example Embodiment

According to the configuration of the present example embodiment, the acquisition unit 11 acquires an inspection result of an information security inspection for the constituent device configuring the communication system 1. The extraction unit 12 extracts, from the inspection result, security inspection information including at least one of first information indicating a library function used by the constituent device or second information indicating the presence or absence of access to the file through the library function. The generation unit 13 generates a virtual model of the communication system 1 by using the configuration information specifying the constituent component of the constituent device and the security inspection information.

The virtual model of the communication system I is generated by using not only the configuration information of the constituent device but also the security inspection information including at least one of the first information indicating the library function used by the constituent device or the second information indicating the presence or absence of access to the file through the library function. As a result, it is possible to provide a virtual model of the communication system I necessary for diagnosing a security risk of the communication system 1 in detail.

According to the configuration of the present example embodiment, the execution unit 34 executes the attack simulation on the communication system I by using the virtual model. The evaluation unit 35 evaluates a security risk of the communication system I based on the result of the attack simulation.

Consequently, a system administrator or a user can accurately recognize the security risk of the communication system 1, and can consider and implement an appropriate measure according to the evaluation result of the security risk.

Hardware Configuration

Figure 9:
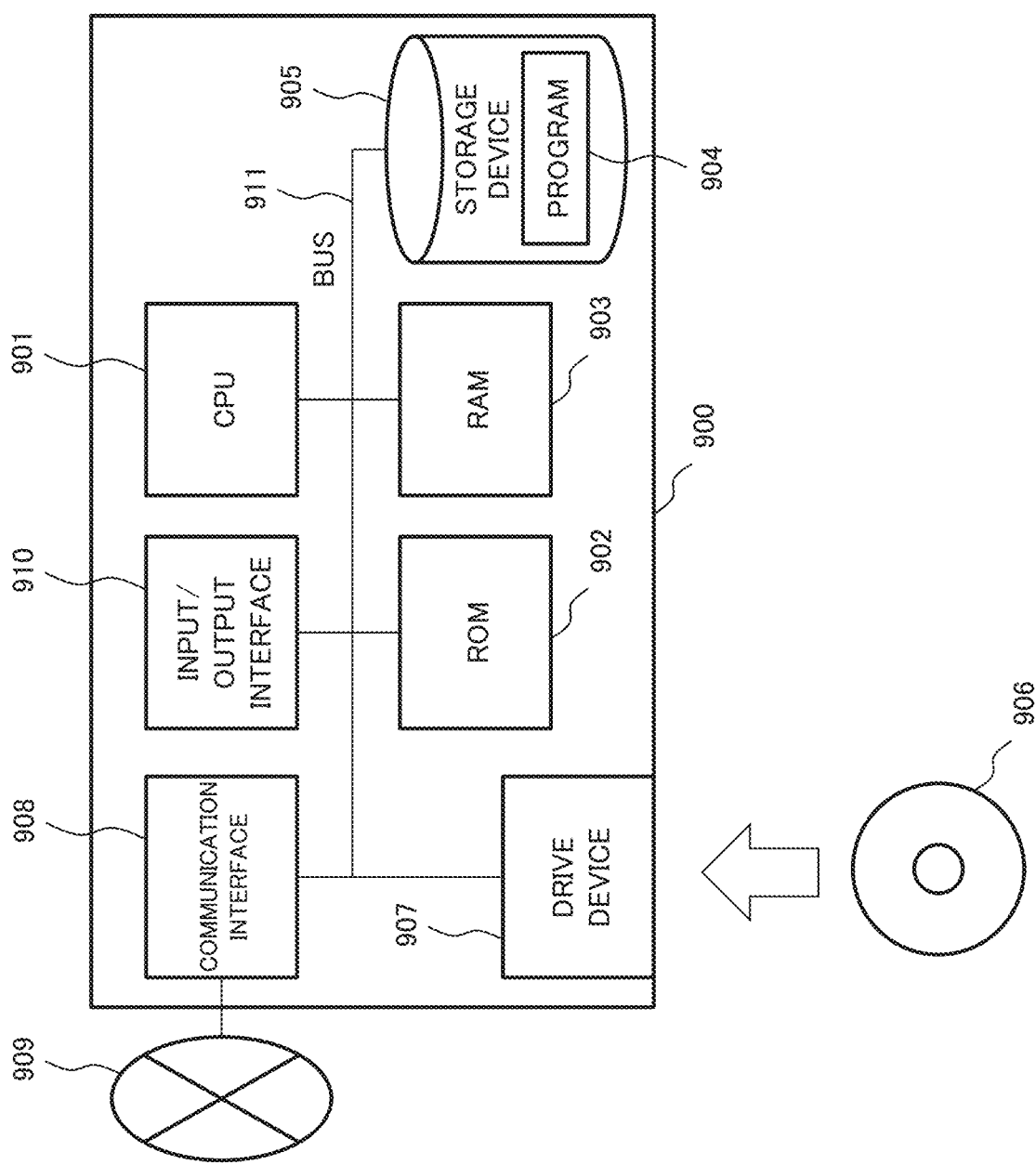
FIG. 9 is a diagram illustrating an example of a hardware configuration of a data processing device according to any one of the first to third example embodiments.

Each constituent element of the data processing devices 10, 20, and 30 described in the first to third example embodiments indicates a block in the functional unit. Some or all of these constituent elements are implemented by an information processing device 900 as illustrated in FIG. 9, for example. FIG. 9 is a block diagram illustrating an example of a hardware configuration of the information processing device 900.

As illustrated in FIG. 9, the information processing device 900 includes the following configuration as an example.

Central processing unit (CPU) 901.

Read only memory (ROM) 902

Random access memory (RAM) 903

Program 904 loaded into RAM 903

Storage device 905 storing program 904

Drive device 907 that performs reading and writing on recording medium 906

Communication interface 908 connected to communication network 909

Input/output interface 910 inputting/outputting data

Bus 911 connecting respective constituent elements

The constituent elements of the data processing devices 10, 20, and 30 described in the first to third example embodiments are implemented by the CPU 901 reading and executing the program 904 that achieves these functions. The program 904 for achieving the function of each constituent element is stored in the storage device 905 or the ROM 902 in advance, for example, and the CPU 901 loads the program into the RAM 903 and executes the program as necessary. Note that the program 904 may be supplied to the CPU 901 via the communication network 909, or may be stored in advance in the recording medium 906, and the drive device 907 may read the program and supply the program to the CPU 901.

According to the above configuration, the data processing devices 10, 20, and 30 described in the first to third example embodiments are achieved as hardware. Therefore, an effect similar to the effect described in any one of the first to third example embodiments can be achieved.

SUPPLEMENTARY NOTE

One aspect of the present invention can be described as, but not limited to, the following supplementary notes.

Supplementary Note 1

A data processing device including:

acquisition means configured to acquire an inspection result of an information security inspection for a constituent device configuring a communication system;

extraction means configured to extract, from the inspection result, security inspection information including at least one of first information indicating a library function used by the constituent device or second information indicating presence or absence of access to a file through the library function; and generation means configured to generate a virtual model of the communication system by using configuration information specifying a constituent component of the constituent device and the security inspection information.

Supplementary Note 2

The data processing device according to Supplementary Note 1, further including:

execution means configured to execute an attack simulation on the communication system by using the virtual model; and evaluation means configured to evaluate a security risk of the communication system based on a result of the attack simulation.

Supplementary Note 3

The data processing device according to Supplementary Note 1 or 2, in which the inspection result includes a result of file falsification detection.

Supplementary Note 4

The data processing device according to any one of Supplementary Notes 1 to 3, in which
the communication system is any one of an Internet of Things (IoT) system, an information and communication technology (ICT) system, an operational technology (OT) system, an infrastructure system, and a control system.

Supplementary Note 5

A data processing method including:
acquiring an inspection result of an information security inspection for a constituent device configuring a communication system;
extracting, from the inspection result, security inspection information including at least one of first information indicating a library function used by the constituent device or second information indicating presence or absence of access to a file through the library function; and
generating a virtual model of the communication system by using configuration information specifying a constituent component of the constituent device and the security inspection information.

Supplementary Note 6

The data processing method according to Supplementary Note 5, further including:
executing an attack simulation on the communication system by using the virtual model; and
evaluating a security risk of the communication system based on a result of the attack simulation.

Supplementary Note 7

A non-transitory recording medium storing a program for causing a computer to execute:
acquiring an inspection result of an information security inspection for a constituent device configuring a communication system;
extracting, from the inspection result, security inspection information including at least one of first information indicating a library function used by the constituent device or second information indicating presence or absence of access to a file through the library function; and
generating a virtual model of the communication system by using configuration information specifying a constituent component of the constituent device and the security inspection information.

Supplementary Note 8

The recording medium according to Supplementary Note 7, storing a program for causing the computer to further execute:
executing an attack simulation on the communication system by using the virtual model; and
evaluating a security risk of the communication system based on a result of the attack simulation.

INDUSTRIAL APPLICABILITY

The present invention can be used for diagnosing a communication system, for example, analyzing vulnerability of a constituent device configuring the communication system and evaluating a security risk of the communication system.

REFERENCE SIGNS LIST 1 communication system
10 data processing device
11 acquisition unit
12 extraction unit
13 generation unit
20 data processing device
30 data processing device
34 execution unit
35 evaluation unit
100 node (control server)
200 node (client terminal)
300 switch
400 firewall

What is claimed is:
1. A data processing device comprising:
a memory configured to store instructions; and
at least one processor configured to run the instructions to perform:
acquiring an inspection result of an information security inspection for a constituent device configuring a communication system;
extracting, from the inspection result, security inspection information including at least one of first information indicating a library function used by the constituent device or second information indicating presence or absence of access to a file through the library function; and
generating a virtual model of the communication system by using configuration information indicating a constituent component of the constituent device and the library function used by the constituent device.
2. The data processing device according to claim 1, further comprising:
the at least one processor is configured to run the instructions to perform:
executing an attack simulation on the communication system by using the virtual model; and
evaluating a security risk of the communication system based on a result of the attack simulation.
3. The data processing device according to claim 1, wherein
the inspection result includes a result of file falsification detection.
4. The data processing device according to claim 1, wherein
the communication system is any one of an Internet of Things (IoT) system, an information and communication technology (ICT) system, a local area network (LAN), an infrastructure system, and an industrial control system (ICS).
5. A data processing method comprising:
acquiring an inspection result of an information security inspection for a constituent device configuring a communication system;
extracting, from the inspection result, security inspection information including at least one of first information indicating a library function used by the constituent device or second information indicating presence or absence of access to a file through the library function; and generating a virtual model of the communication system by using configuration information indicating a constituent component of the constituent device and the library function used by the constituent device.

6. The data processing method according to claim 5, further comprising:

executing an attack simulation on the communication system by using the virtual model; and evaluating a security risk of the communication system based on a result of the attack simulation.

7. A non-transitory recording medium storing a program for causing a computer to execute:

acquiring an inspection result of an information security inspection for a constituent device configuring a communication system;

extracting, from the inspection result, security inspection information including at least one of first information indicating a library function used by the constituent device or second information indicating presence or absence of access to a file through the library function; and generating a virtual model of the communication system by using configuration information indicating a constituent component of the constituent device and the library function used by the constituent device.

8. The recording medium according to claim 7, storing a program for causing the computer to further execute:

executing an attack simulation on the communication system by using the virtual model; and evaluating a security risk of the communication system based on a result of the attack simulation.

* * * * *